United States Patent
Blackburn et al.

(10) Patent No.: US 10,180,885 B2
(45) Date of Patent: Jan. 15, 2019

(54) PRIORITIZED DATA RECOVERY FROM AN OBJECT STORAGE SERVICE AND CONCURRENT DATA BACKUP

(71) Applicant: NetApp, Inc., Sunnyvale, CA (US)

(72) Inventors: Mitch Blackburn, Wichita, KS (US); Charles Binford, Wichita, KS (US); Reid Kaufmann, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 497 days.

(21) Appl. No.: 14/937,192

(22) Filed: Nov. 10, 2015

(65) Prior Publication Data

US 2017/0132086 A1 May 11, 2017

(51) Int. Cl.
G06F 11/14 (2006.01)
(52) U.S. Cl.
CPC ...... *G06F 11/1469* (2013.01); *G06F 11/1466* (2013.01); *G06F 11/1461* (2013.01)
(58) Field of Classification Search
CPC ............. G06F 11/1451; G06F 11/1458; G06F 11/1466; G06F 11/1469
See application file for complete search history.

(56) References Cited

U.S. PATENT DOCUMENTS

| | | | | |
|---|---|---|---|---|
| 5,930,824 A * | 7/1999 | Anglin | ................ | G06F 11/1469 345/418 |
| 6,047,294 A * | 4/2000 | Deshayes | ............ | G06F 11/1456 |
| 8,572,337 B1 * | 10/2013 | Gokhale | ............. | G06F 11/1466 707/639 |
| 9,239,794 B1 * | 1/2016 | Merchant | ............ | G06F 12/0862 |
| 2005/0171979 A1 * | 8/2005 | Stager | ................. | G06F 11/1466 |
| 2006/0047996 A1 * | 3/2006 | Anderson | ........... | G06F 11/1469 714/2 |
| 2006/0143501 A1 * | 6/2006 | Tormasov | ........... | G06F 11/1417 714/6.3 |
| 2007/0156982 A1 * | 7/2007 | Meiri | ................... | G06F 11/2064 711/162 |
| 2007/0174569 A1 * | 7/2007 | Schnapp | ............... | G06F 3/0604 711/162 |
| 2010/0023561 A1 * | 1/2010 | Zlotnick | ............. | G06F 11/1469 707/E17.008 |
| 2011/0004586 A1 * | 1/2011 | Cherryholmes | .... | G06F 11/1469 707/682 |
| 2012/0210077 A1 * | 8/2012 | Hoshino | .......... | G11B 20/10527 711/154 |

(Continued)

*Primary Examiner* — William Spieler
(74) *Attorney, Agent, or Firm* — Haynes and Boone, LLP (57) ABSTRACT

A system and method are provided for backing up and recovering data that allows the data to be modified and backed up even while recovery is still in progress. In some embodiments, the method includes performing a data recovery procedure on a computing system. The data recovery procedure includes identifying a set of data objects stored on a recovery system; retrieving the set of data objects; and storing data of the retrieved set of data objects to at least one storage device. Data objects may be prioritized so that data that is in demand is retrieved first. Data that is modified during the data recovery procedure is tracked and backed up to an object-storage system during the data recovery procedure. In some embodiments, backing up the modified data is part of an incremental backup procedure that excludes data objects that contains only unmodified data.

20 Claims, 9 Drawing Sheets

(56) References Cited

U.S. PATENT DOCUMENTS

| | | | |
|---|---|---|---|
| 2014/0074790 A1* | 3/2014 | Berman | G06F 17/3007 |
| | | | 707/649 |
| 2014/0281131 A1* | 9/2014 | Joshi | G06F 12/0804 |
| | | | 711/103 |
| 2014/0281138 A1* | 9/2014 | Karamcheti | G06F 12/0246 |
| | | | 711/103 |

* cited by examiner

| Data Extent | Recovery Point T0<br>Preceding RP: None<br>List of Recovery Obj. | Recovery Point T1<br>Preceding RP: T0<br>List of Recovery Obj. | Recovery Point T2<br>Preceding RP: T1<br>List of Recovery Obj. | Recovery Point T3<br>Preceding RP: T2<br>List of Recovery Obj. | Recovery Point T4<br>Preceding RP: T3<br>List of Recovery Obj. |
|---|---|---|---|---|---|
| 00000-00999 | 00000_T0 | 00000_T1 | 00000_T2 | 00000_T3 | 00000_T4 |
| 01000-01999 | 01000_T0 | --- | 01000_T2 | 01000_T3 | 01000_T4 |
| 02000-02999 | 02000_T0 | --- | 02000_T2 | --- | --- |
| 03000-03999 | 03000_T0 | 03000_T1 | --- | 03000_T3 | --- |
| 04000-04999 | 04000_T0 | --- | 04000_T2 | 04000_T3 | 04000_T4 |
| 05000-05999 | 05000_T0 | 05000_T1 | 05000_T2 | --- | --- |
| 06000-06999 | 06000_T0 | --- | --- | --- | 06000_T4 |
| 07000-07999 | 07000_T0 | --- | 07000_T2 | 07000_T3 | --- |

| Data Extent | Recovery Point T0 | Recovery Point T1 | Recovery Point T2 | Recovery Point T3 | Recovery Point T4 | Recovery Point T5 |
|---|---|---|---|---|---|---|
| | Preceding RP: None | Preceding RP: T0 | Preceding RP: T1 | Preceding RP: T2 | Preceding RP: T3 | Preceding RP: T3 |
| | List of Recovery Obj. | List of Recovery Obj. | List of Recovery Obj. | List of Recovery Obj. | List of Recovery Obj. | List of Recovery Obj. |
| 00000-00999 | 00000_T0 | 00000_T1 | 00000_T2 | 00000_T3 | 00000_T4 | 00000_T5 |
| 01000-01999 | 01000_T0 | --- | 01000_T2 | 01000_T3 | 01000_T4 | --- |
| 02000-02999 | 02000_T0 | --- | 02000_T2 | --- | --- | --- |
| 03000-03999 | 03000_T0 | 03000_T1 | --- | 03000_T3 | --- | --- |
| 04000-04999 | 04000_T0 | --- | 04000_T2 | 04000_T3 | 04000_T4 | --- |
| 05000-05999 | 05000_T0 | 05000_T1 | 05000_T2 | --- | --- | 05000_T5 |
| 06000-06999 | 06000_T0 | --- | --- | --- | 06000_T4 | --- |
| 07000-07999 | 07000_T0 | --- | 07000_T2 | 07000_T3 | --- | 07000_T5 |

PRIORITIZED DATA RECOVERY FROM AN OBJECT STORAGE SERVICE AND CONCURRENT DATA BACKUP

TECHNICAL FIELD

The present description relates to data backup, and more specifically, to techniques for prioritizing the order in which data is restored and for restoring data without interrupting regular backups.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Hand-in-hand with this trend, system administrators have taken advantage of falling storage prices to add capacity wherever possible.

However, one drawback to this abundance of cheap storage is the need to maintain regular backup copies of increasing amounts of data. Even though storage devices have become more reliable, they are not infallible. When multiple storage devices are grouped in a RAID array or other grouping, the probability of failure increases with each storage device added. While many RAID configurations offer redundancy such as parity or mirroring, it is still possible for a catastrophic failure to exceed the ability of the array to recover. Furthermore, RAID and other hardware redundancy safeguards offer no protection from user errors and accidentally deleted files.

While a number of backup solutions exist, backup and restore remain extremely time-consuming processes due, in part, to ever-increasing volume sizes. In typical examples, it takes hours or even days to restore data from a backup. While the simplest solution is to take the volume out of service during data restoration, in many applications, it is unacceptable for a volume to be inaccessible for this long. While further examples allow reads of the data that has already been restored, writes may still be prohibited or at least not guaranteed while data restoration is still in progress. Thus, while existing techniques for data protection have been generally adequate, the techniques described herein provide more efficient data backup and restoration, and in many examples, allow a system to continue to perform new data transactions while data is being restored.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for recovering data from a backup. In an exemplary embodiment, a storage system receives a request to recover data from a cloud-based object store. The storage system prioritizes the order in which data is recovered so that data currently being accessed is recovered immediately. Data may also be prioritized by temporal locality, whereby the most recently read, written, and/or modified data is recovered first; spatial locality, whereby data near frequently accessed data addresses is recovered first, and/or any other suitable criterion. This allows the storage system to continue to service transactions while data is being recovered and may reduce transaction latency during the recovery process. In turn, this allows users to resume normal activity before the complete volume has been restored.

Because users may modify data during the recovery process, it may be advantageous for the storage system to continue regularly-scheduled backups during the recovery. In some examples, the storage system tracks these changes to the underlying data in a manner such that both incremental and full backups may be performed even before the data set has been completely recovered. In this way, the storage system protects the integrity of the new data as well as the data being recovered.

Figure 1:
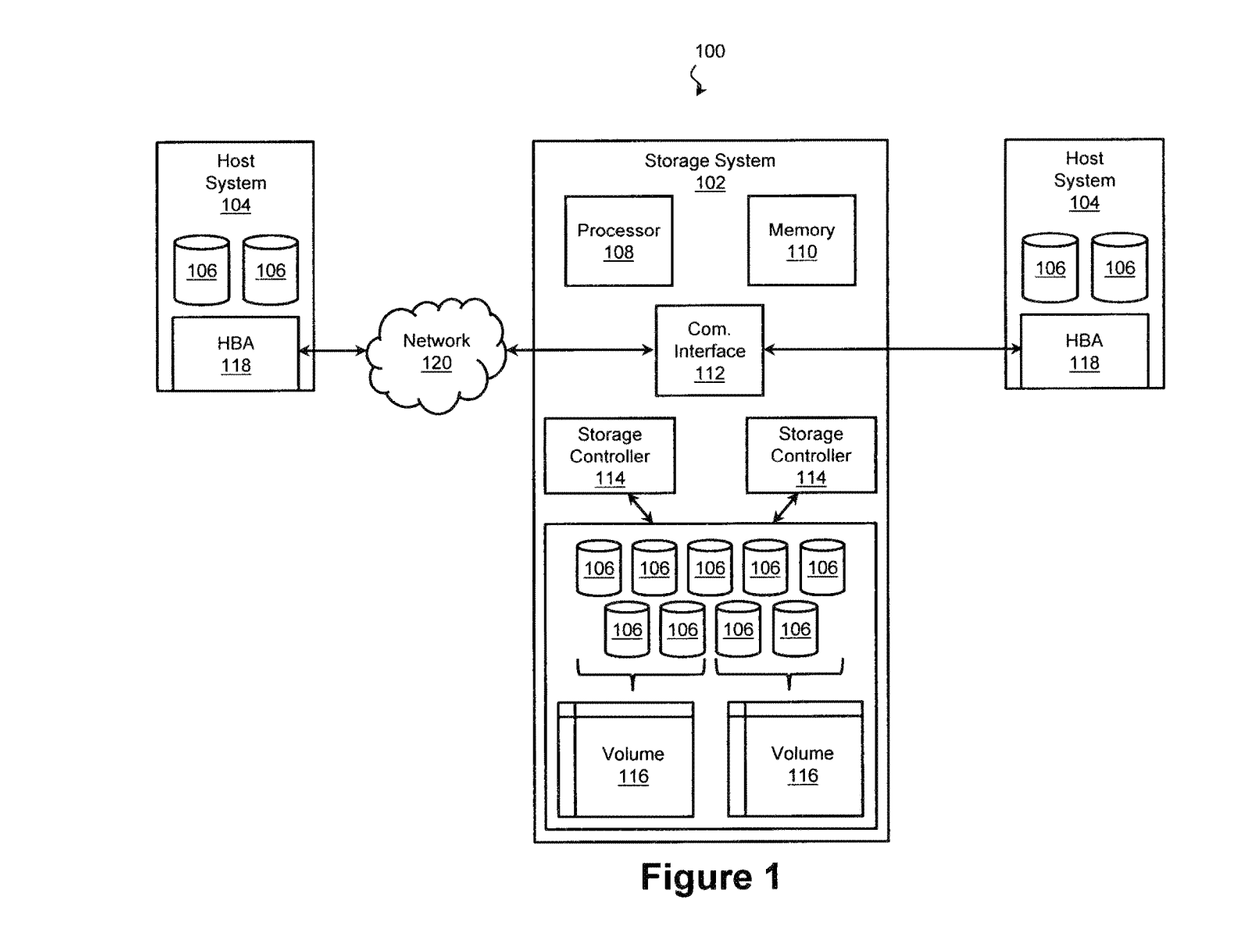
FIG. 1 is a schematic diagram of a computing architecture according to aspects of the present disclosure.

FIG. 1 is a schematic diagram of a computing architecture 100 according to aspects of the present disclosure. The computing architecture 100 includes a number of computing systems, including one or more storage systems 102 and one or more host systems 104 (hosts), each of which may store and manipulate data. Techniques for preserving and restoring this data are described with reference to the figures that follow.

In the illustrated embodiment, the computing architecture 100 includes one or more storage systems 102 in communication with one or more hosts 104. It is understood that for clarity and ease of explanation, only a single storage system 102 and a limited number of hosts 104 are illustrated, although the computing architecture 100 may include any number of hosts 104 in communication with any number of storage systems 102. An exemplary storage system 102 receives data transactions (e.g., requests to read and/or write data) from the hosts 104 and takes an action such as reading, writing, or otherwise accessing the requested data so that storage devices 106 of the storage system 102 appear to be directly connected (local) to the hosts 104. This allows an application running on a host 104 to issue transactions directed to storage devices 106 of the storage system 102 and thereby access data on the storage system 102 as easily as it can access data on the storage devices 106 of the host 104. In that regard, the storage devices 106 of the storage system 102 and the hosts 104 may include hard disk drives (HDDs), solid state drives (SSDs), RAM drives, optical drives, and/or any other suitable volatile or non-volatile data storage medium.

While the storage system 102 and the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor 108 such as a microcontroller or a central processing unit (CPU) operable to perform various computing instructions. The computing system may also include a memory device 110 such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface 112 such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 in communication with one or more storage controllers 114. The storage controllers 114 exercise low-level control over the storage devices 106 in order to execute (perform) data transactions on behalf of the hosts 104, and in so doing, may group the storage devices for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 104. In this way, the storage system 102 represents the group of devices as a single device, often referred to as a volume 116. Thus, a host 104 can access the volume 116 without concern for how it is distributed among the underlying storage devices 106.

Turning now to the hosts 104, a host 104 includes any computing resource that is operable to exchange data with a storage system 102 by providing (initiating) data transactions to the storage system 102. In an exemplary embodiment, a host 104 includes a host bus adapter (HBA) 118 in communication with a storage controller 114 of the storage system 102. The HBA 118 provides an interface for communicating with the storage controller 114, and in that regard, may conform to any suitable hardware and/or software protocol. In various embodiments, the HBAs 118 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 118 are coupled to the storage system 102 via a network 120, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 118 of a host 104 sends one or more data transactions to the storage system 102 via the network 120. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Thus, a user of the exemplary computing architecture 100 may have data stored on one or more hosts 104 as well as on the storage system 102. In order to preserve this data, backup copies may be made at regular intervals and preserved so that they can be restored later. In many embodiments, the backup copies are stored on different storage devices 106 and/or different computing systems to protect against a single point of failure compromising both the original and the backup. Any suitable backup technique may be used to preserve the data on the storage devices 106 of the hosts 104 and/or storage system 102. One such technique involves backing up data to an object storage service and is disclosed in U.S. patent application Ser. No. 14/521,053, filed Oct. 22, 2014, by William Hetrick et al., entitled "DATA BACKUP TECHNIQUE FOR BACKING UP DATA TO AN OBJECT STORAGE SERVICE", the entire disclosure of which is herein incorporated in its entirety.

Figure 2:
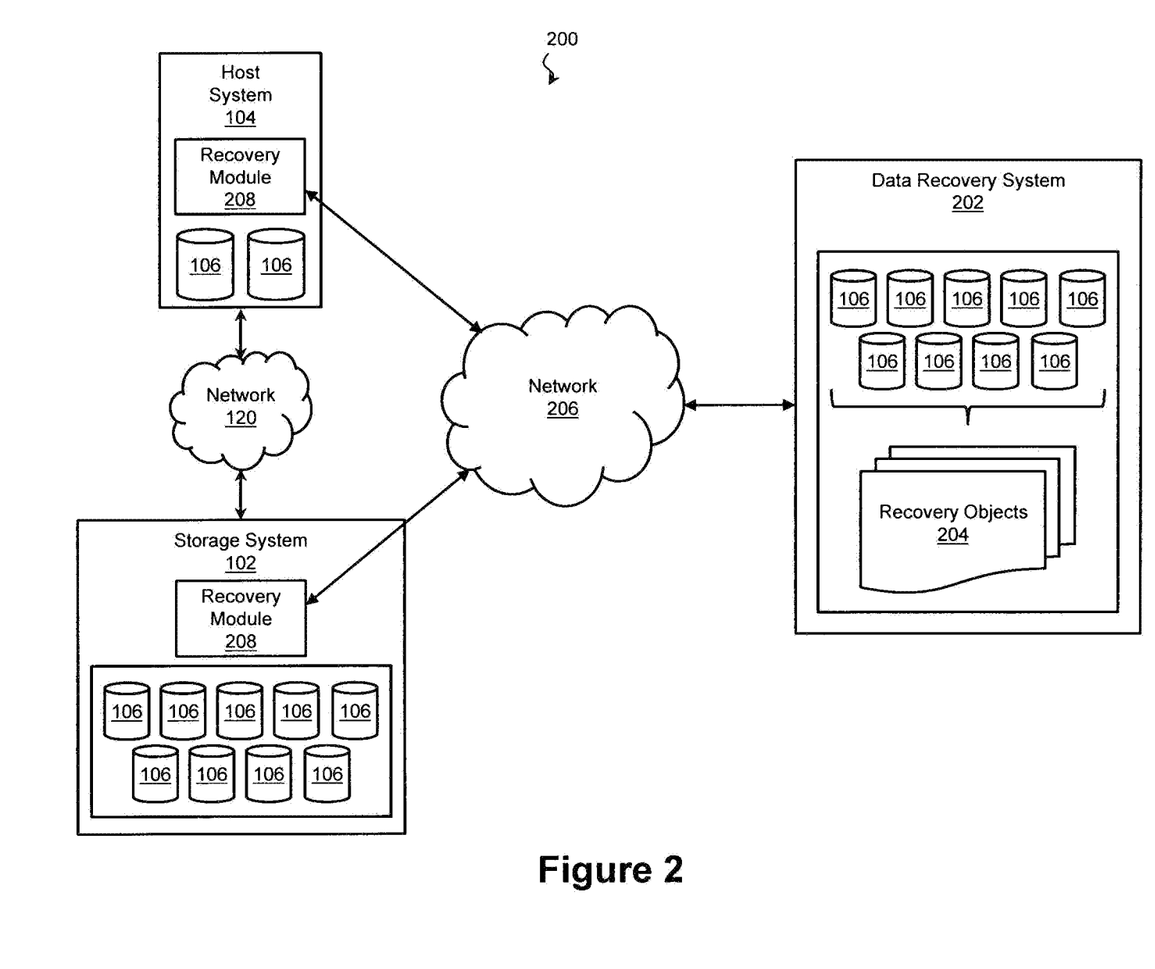
FIG. 2 is a schematic diagram of a computing architecture including an object-based backup system according to aspects of the present disclosure.
Figure 3:
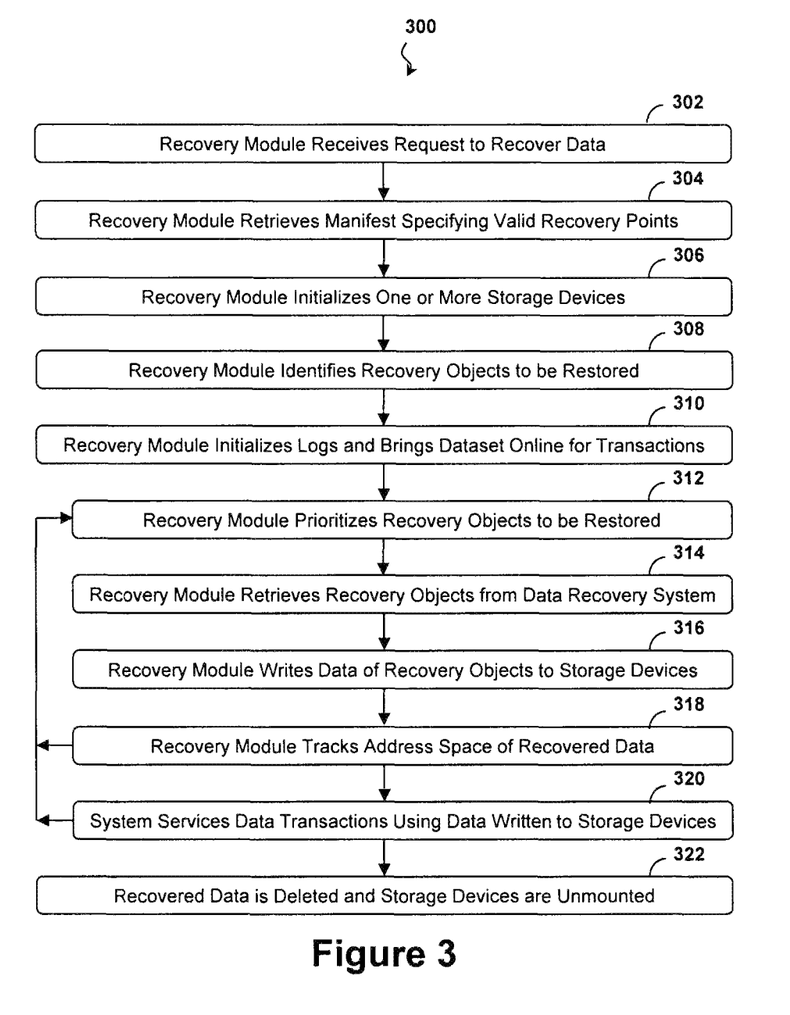
FIG. 3 is a flow diagram of a method of recovering data according to aspects of the present disclosure.
Figure 4:
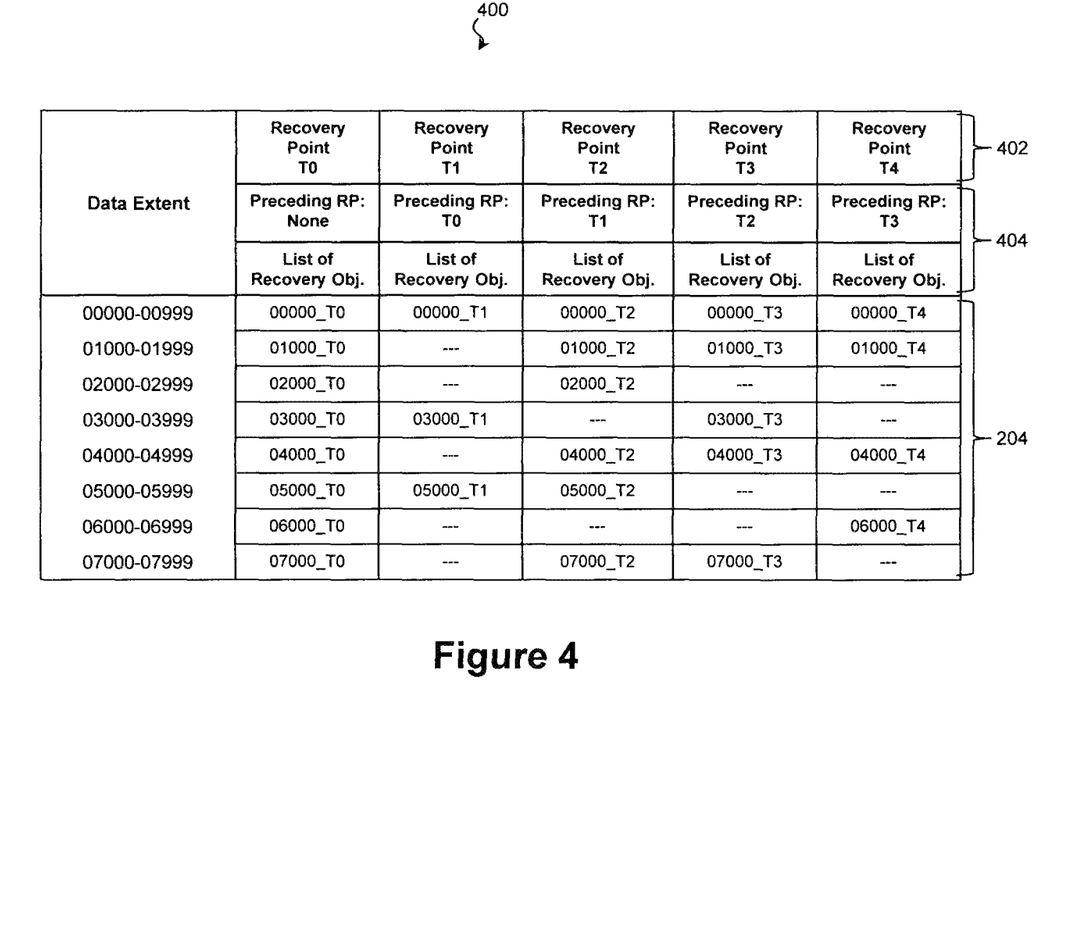
FIG. 4 is a memory diagram of the contents of an object store of an object-based backup system according to aspects of the present disclosure.
Figure 5:
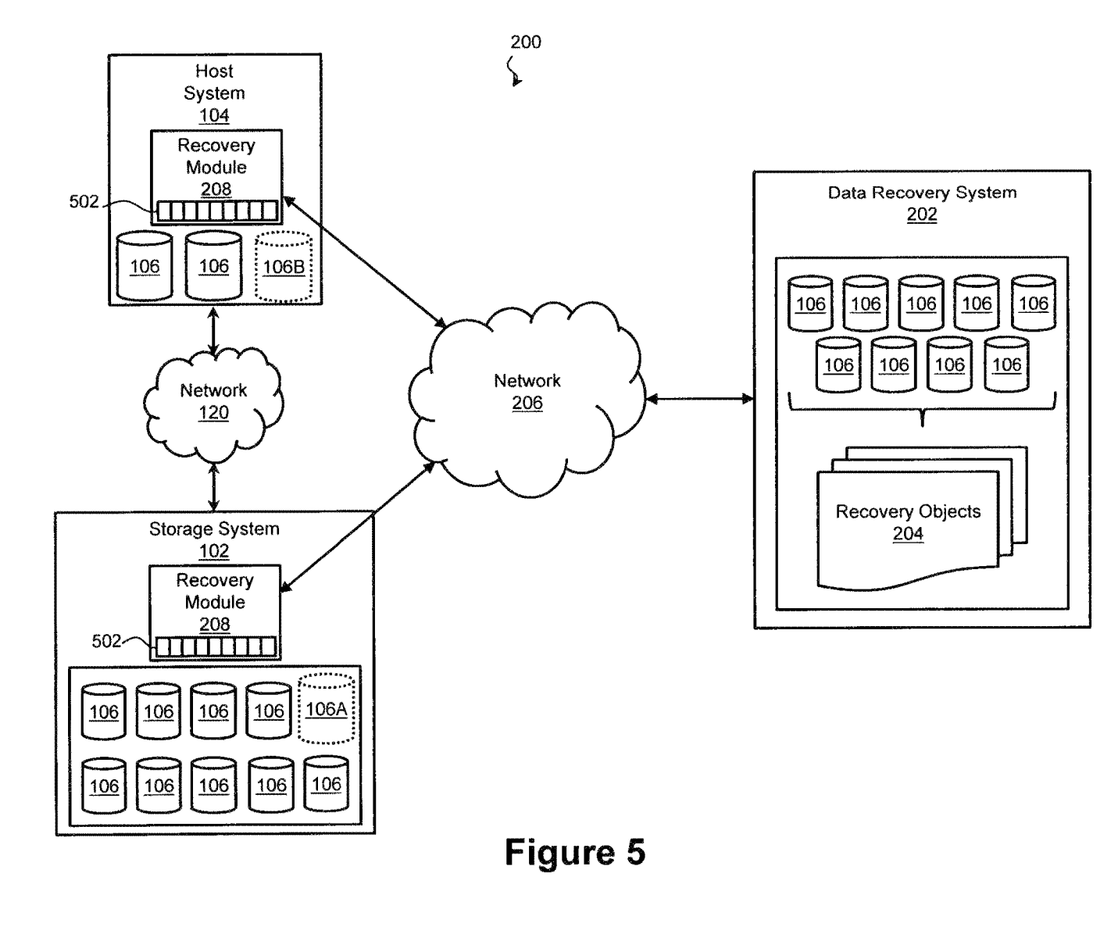
FIG. 5 is a schematic diagram of the computing architecture undergoing the method of recovering data according to aspects of the present disclosure.

An exemplary technique for restoring data from an object data store is disclosed with reference to FIGS. 2 through 5. The object data store is merely one example of a repository where the backup copy may be maintained, and the present technique is equally applicable regardless of where the backup is actually stored. In that regard, other backup repositories are both contemplated and provided for. FIG. 2 is a schematic diagram of a computing architecture 200 including an object-based backup system according to aspects of the present disclosure. FIG. 3 is a flow diagram of a method 300 of recovering data according to aspects of the present disclosure. It is understood that additional steps can be provided before, during, and after the steps of method 300, and that some of the steps described can be replaced or eliminated for other embodiments of the method. FIG. 4 is a memory diagram of the contents of an object store of an object-based backup system according to aspects of the present disclosure. FIG. 5 is a schematic diagram of the computing architecture 200 undergoing the method 300 of recovering data according to aspects of the present disclosure.

Referring first to FIG. 2, the illustrated computing architecture 200 may be substantially similar to the computing architecture 100 of FIG. 1 and may include one or more hosts 104 and storage systems 102, each substantially similar to those of FIG. 1. The host(s) 104 and storage system(s) 102 are communicatively coupled to a data recovery system 202, which contains backup copies of data obtained from the host(s) 104 and/or the storage system 102. The data recovery system 202 may be an object-based data system and may store the backup data as one or more recovery objects 204.

In brief, object-based data systems provide a level of abstraction that allows data of any arbitrary size to be specified by an object identifier. In contrast, block-level data transactions refer to data using an address that corresponds to a sector of a storage device and may include a physical address (i.e., an address that directly map to a storage device) and/or a logical address (i.e., an address that is translated into a physical address of a storage device). Exemplary block-level protocols include iSCSI, Fibre Channel, and Fibre Channel over Ethernet (FCoE). As an alternative to block-level protocols, file-level protocols specify data locations by a file name. A file name is an identifier within a file system that can be used to uniquely identify corresponding memory addresses. File-level protocols rely on a computing system to translate the file name into respective storage device addresses. Exemplary file-level protocols include CIFS/SMB, SAMBA, and NFS. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3.

Accordingly, in an example, the data recovery system 202 communicates with the host(s) 104 and the storage system 102 using HTTP, an object-level protocol, over a network 206, which may be substantially similar to network 120. In that regard, network 206 may include any number of wired and/or wireless networks such as a LAN, an Ethernet subnet, a PCI or PCIe subnet, a switched PCIe subnet, a WAN, a MAN, the Internet, or the like, and may be part of network 120 or may be a completely different network. In the example, network 120 is an intranet (e.g., a LAN or WAN), while network 206 is the Internet.

As with the host 104 and the storage system 102, while the data recovery system 202 is referred to as a singular entity, it may include any number of computing devices and may range from a single computing system to a system cluster of any size. Accordingly, the data recovery system 202 includes at least one computing system, which in turn includes a processor, a memory device, a video controller such as a graphics processing unit (GPU), a communication interface, and/or a user I/O interface. The data recovery system 202 also contains one or more storage devices 106 having recovery objects 204 stored thereupon. Either or both of the host 104 and the storage system 102 may store backup copies of their data as recovery objects 204 on the data recovery system and may recover backup data from the recovery objects 204. Accordingly, the host 104 and/or the storage system 102 may contain a recovery module 208 in communication with the data recovery system 202 to perform data recovery processes.

One such recovery process is described in method 300. The data to be recovered is stored on the data recovery system 202, and being object-based, the data recovery system 202 may store it as one or more recovery objects 204, each containing data stored in various block ranges (data extents) of an address space. The data recovery system may also store recovery objects 204 containing configuration data, metadata, or other information, as described in more detail below. In the method that follows, these recovery objects 204 are used to recover the data of the address space block-by-block, and accordingly some examples of the technique may be described as block-based recovery from an object-based repository.

A simple example of these recovery objects 204 is explained with reference to FIG. 4. The memory diagram 400 of FIG. 4 shows the recovery objects 204 stored in the data recovery system 202, which correspond to five points in time (recovery points), T0-T4, with T0 being the earliest. The data recovery system 202 may store a recovery point list 402 (a type of metadata-containing data object) that identifies each recovery point, and each recovery point may have a corresponding recovery point manifest 404 (another type of metadata-containing data object) that records those recovery objects associated with the respective recovery point. In this example, each storage object is named based on a corresponding block range and a timestamp (e.g., "01000_T0 "). The data recovery system 202 supports incremental backups where unchanged data is not duplicated with a new timestamp. Instead, the manifest 404 for a recovery point may simply refer to recovery objects from other recovery points.

For example, the manifest 404 for recovery point T2 may specify those recovery objects with a timestamp T2, and for address ranges where a T2-stamped recovery object is not available, the manifest 404 may specify recovery objects from other recovery points. In the example, the manifest 404 includes the recovery objects: {00000_T2, 01000_T2, 02000_T2, 03000_T1, 04000_T2, 05000_T2, 02000_T0, and 07000_T2}. Object 03000_T3 would not be included because T3 represents data that was changed after recovery point T2. Similarly, object 03000_T0 would not be included because object 03000_T1 is newer and represents the data at time T2.

The data recovery process will now be described in detail. Referring first to block 302 of FIG. 3 and referring back to FIG. 2, a recovery module 208 of a host 104, a storage system 102, or a third-party system receives a request to recover data. The request may be a user request or an automated request and may be provided by a user, another program, or any other suitable source. The request may identify the data to be recovered and/or may request a list of data available for recovery on the data recovery system 202. In various embodiments, the request identifies data to be recovered by volume, block range, filename, metadata, and/or other suitable identifier.

If the request of block 302 does not specify a particular recovery point, the recovery module 208 retrieves the recovery point list 402 stored on the data recovery system 202 as shown in block 304. Valid recovery points are those where the entire requested address range is available. In the example of FIG. 4, T0 is a valid recovery point because the associated manifest 404 specifies a recovery object 204 with a timestamp of T0 for each data extent in the address space. While T2 does not have a recovery object 204 with a timestamp of T2 for each data extent, it references recovery objects 204 from previous recovery points for data that did not change. Therefore, the data at time T2 can be recovered using recovery objects: {00000_T2, 01000_T2, 02000_T2, 03000_T1, 04000_T2, 05000_T2, 02000_T0, 07000_T2}, which correspond to the recovery objects 204 with a timestamp of T2, where available, and otherwise to the recovery objects 204 of the preceding recovery points, T0 and/or T1.

From the recovery point list 402 and the manifest 404, the recovery module 208 may determine a specific recovery point to restore. This may include providing a list of valid recovery points at a user interface, an application interface, and/or other suitable interface, and receiving a user command selecting a recovery point.

Referring to block 306 of FIG. 3 and to FIG. 5, the recovery module 208 initializes one or more storage devices 106 upon which to store the restored data. In various examples, the recovery module 208 initializes storage devices 106 that are directly connected to (local to) the storage system 102 (as in the example of storage device 106A), local to the host system 104 (as in the example of the storage device 106B), and/or local to any other computing system. In some embodiments, the initialized storage devices 106 are local to a different computing system than the system that contains the recovery module 208 performing the recovery technique. For example, in one such embodiment, the recovery module 208 runs on the host 104, while the initialized storage devices 106 are local to the storage system 102. In the course of initializing the storage devices 106, the recovery module 208 may configure the storage devices 106 based on one or more QoS options (e.g., storage medium, RAID level, permissions, encryption, etc.). The recovery module 208 may configure the storage devices 106 based on a QoS configuration of the data at the time it was backed and/or based on a QoS configuration specified by the request. For example, the recovery module 208 may impose encryption regardless if the data to be recovered was originally encrypted. The prior QoS configuration may be determined from QoS information recorded in the recovery objects 204.

Referring to block 308 of FIG. 3, the recovery module 208 identifies those recovery objects 204 corresponding to the address space of the data and the recovery point selected in blocks 302 and/or 304. To do so, the recovery module 208 may retrieve the manifest 404 associated with the recovery point and determine the recovery objects from the list it contains.

Once the recovery objects 204 have been identified, the computing system can begin or resume servicing transactions directed to the dataset even though it has not yet been restored. Referring to block 310 of FIG. 3, the recovery module may initialize a recovery log 502 and a write log 604 and may then bring the dataset on-line. A recovery log 502 contains a number of entries recording whether data associated with the address space has been recovered and written to the initialized storage devices 106. In its initial state, the recovery log 502 records that no data has been recovered. However, as data is stored to storage devices 106, recovery module 208 records the respective address ranges in the recovery log 502. The recovery log 502 may take the form of bitmap, a hash table, a flat file, an associative array, a linked list, a tree, a state table, a relational database, and/or other suitable memory structure. The recovery log 502 may divide the address space according to any granularity and, in various exemplary embodiments, the recovery log 502 divides the address space into segments having a size between 64 KB and 4 MB.

The write log 604 is described in more detail below, but at a high level, the write log 604 contains a number of entries that record whether data has been written or otherwise modified. The write log 604 may divide the address space according to any granularity and, in many embodiments, the write log 604 utilizes the same granularity as the recovery log 502. In various examples thereof, the write log 604 divides the address space into segments having a size between 64 KB and 4 MB.

Once the recovery objects 204 of the recovery point have been identified, referring to block 312 of FIG. 3, the recovery module 208 prioritizes the recovery objects 204 so that higher priority recovery objects 204 are recovered first. Any suitable criteria may be used to prioritize the retrieval of the recovery objects 204, and the priority may be changed at any time during the recovery process.

For example, in some embodiments, the computing system continues to service data transactions received during the recovery process, and transactions that read or write the data of a recovery object 204 cause the recovery module 208 to change the priorities so that the respective recovery object 204 is recovered sooner, sometimes immediately. In this way, the transactions need not wait for the recovery process to complete entirely. Retrieving a recovery object 204 with a pending transaction may or may not interrupt the retrieval of a lower-priority recovery object 204 that is already in progress.

As a further example, in some embodiments, transactions cause the recovery module 208 to increase the priority of recovery objects 204 corresponding to address ranges near to those being accessed. According to the principle of locality of reference, a read or write to an address is often followed by a read or write to an adjacent address. Thus, the recovery module 208 may prioritize recovering adjacent address ranges with the intent of pre-emptively restoring those recovery objects 204 before the predicted transaction arrives.

In some embodiments, the recovery module 208 increases the priority of recovery objects 204 that were most recently written (prior to creating the recovery point). This is distinct from prioritizing data currently being read or written because it depends on the age of the data prior to the incremental backup. It has been determined that new data is more likely to be accessed than older data. Therefore, the recovery module 208 may prioritize recovery objects 204 with the newest data. This may be determined from metadata associated with the recovery objects 204, from the timestamps of the recovery objects 204, or from any other information. In one such embodiment, the recovery module 208 prioritizes recovery objects 204 with a timestamp of T3 over recovery objects 204 with a timestamp of T2, because the timestamp T3 indicates that they contain data that was modified after time T2. Of course, the recovery module 208 may use more than one of these criteria, and in an exemplary embodiment, the recovery module 208 prioritizes the recovery objects 204 for retrieval based on current transactions, proximity to address ranges being accessed, and data age.

Referring to block 314 of FIG. 3, once the recovery module 208 has prioritized the recovery objects 204, it retrieves the recovery objects 204 from the data recovery system 202 according to the priority. In some embodiments, the data recovery system 202 encrypts, decrypts, compresses, or uncompresses the recovery objects 204 prior to transmission to the recovery module 208. As with all exchanges between the recovery module 208 and the data recovery system 202, the transmission of the recovery objects 204 utilize any suitable protocol. In an exemplary embodiment, the recovery objects 204 are transmitted to the recovery module 208 using HTTP requests and responses transmitted over the network 206.

Referring to block 316 of FIG. 3, the recovery module 208 restores the address space by storing the data contained in the recovery objects 204 on the initialized storage devices 106 at block addresses (physical and/or virtual) determined by the data extents of the respective recovery objects 204. In other words, the data is restored at the exact block address it was at when it was backed up using address identifiers incorporated into the recovery objects 204. The recovery module 208 may also store or apply metadata associated with the data to the initialized storage devices 106.

Referring to block 318 of FIG. 3 and to FIG. 5, the recovery module 208 updates the recovery log 502 to record the address space of the data as it is recovered. The process of blocks 312-318 repeats until all of the specified recovery objects 204 have been retrieved and stored to the storage devices 106.

Throughout the recovery process and after, the computing system having the initialized storage devices 106 and the recovered data may continue to service data transactions directed to the recovered data on behalf of any computing system, as shown in block 320 of FIG. 3. In that regard, the computing system having the recovered data may receive data transactions (e.g., block-level transactions, file-level transactions, object-level transactions including HTTP Representational State Transfer (REST) transactions, or any other suitable transactions) from the host 104, the storage system 102, or any other system; may read, write, or otherwise interact with the recovered data; and may prepare and provide a response to the transaction sender. While the recovery process is underway, data transactions and other system events may cause the recovery module 208 to reassess the retrieval priority of the recovery objects 204 in block 312.

In some applications where the data is only restored temporarily, when the user or application has finished with the recovered data, the recovery module 208 may delete the data and may return the initialized storage devices 106 to the general storage pool, as shown in block 322 of FIG. 3. In this way, the computing architecture 200 provides a data recovery technique for recovering a block-level data set using an object-level data store. By prioritizing the order in which the recovery objects 204 are restored and by allowing data transactions to be performed even before all of the data has been recovered, the present technique provides a significant improvement over conventional techniques.

Figure 6:
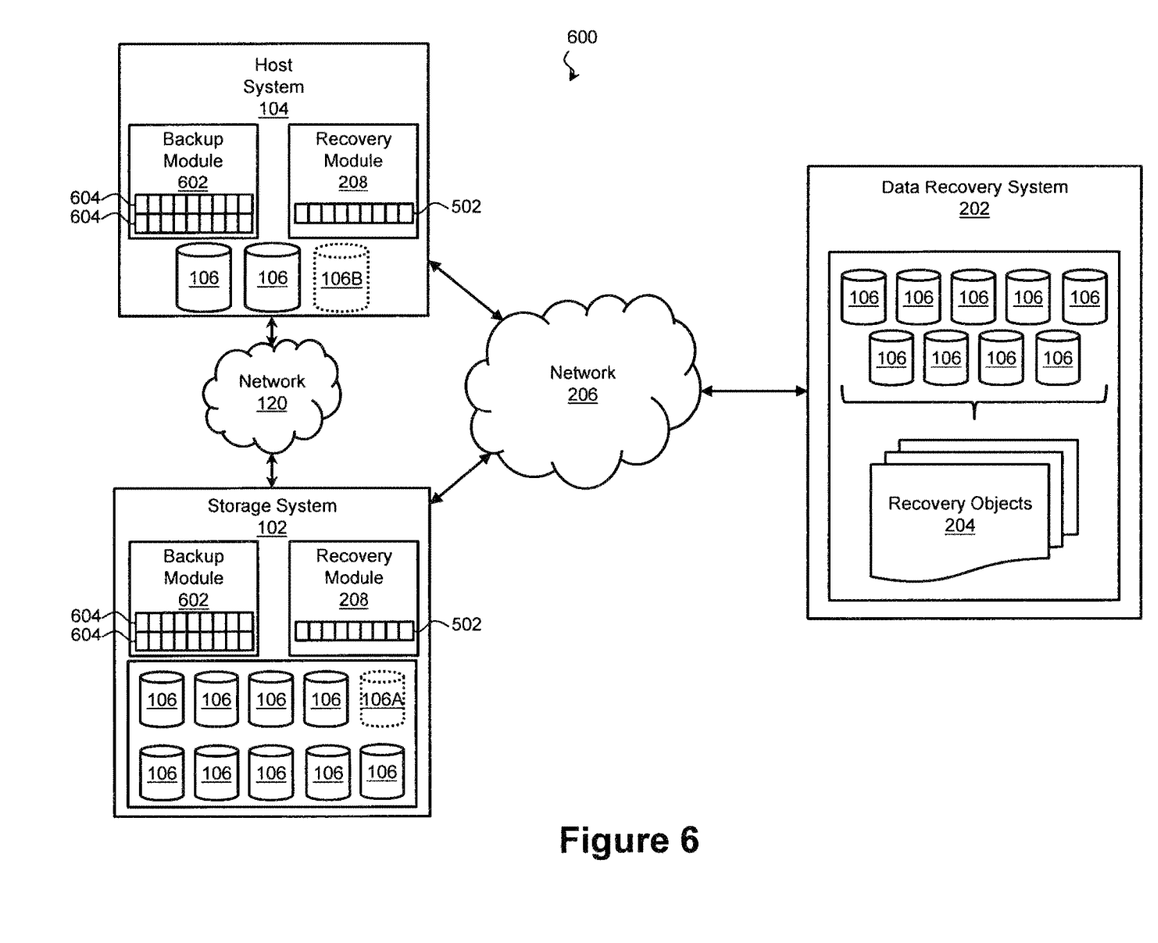
FIG. 6 is a schematic diagram of a computing architecture including an object-based backup system according to aspects of the present disclosure.
Figure 7:
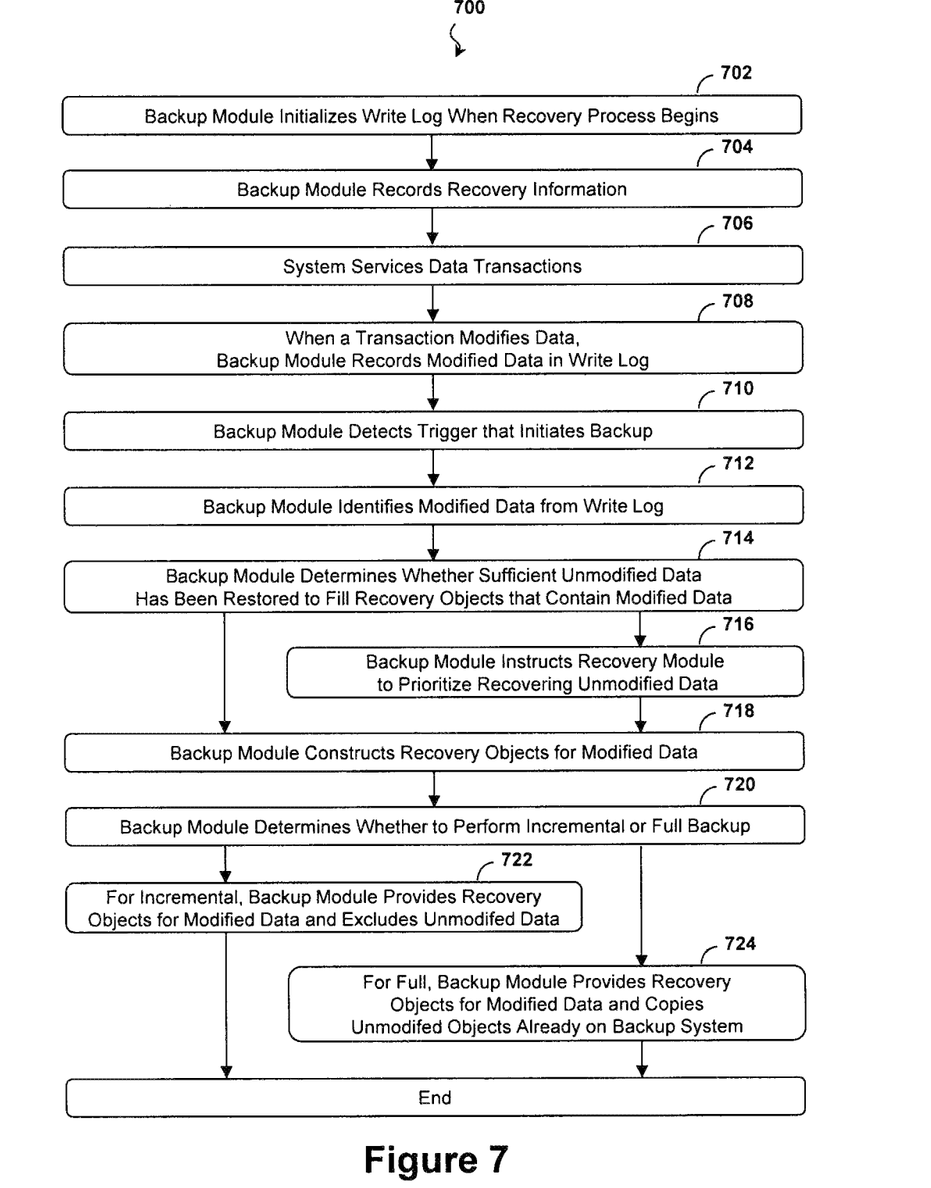
FIG. 7 is a flow diagram of a method of backing up data according to aspects of the present disclosure.
Figure 8:
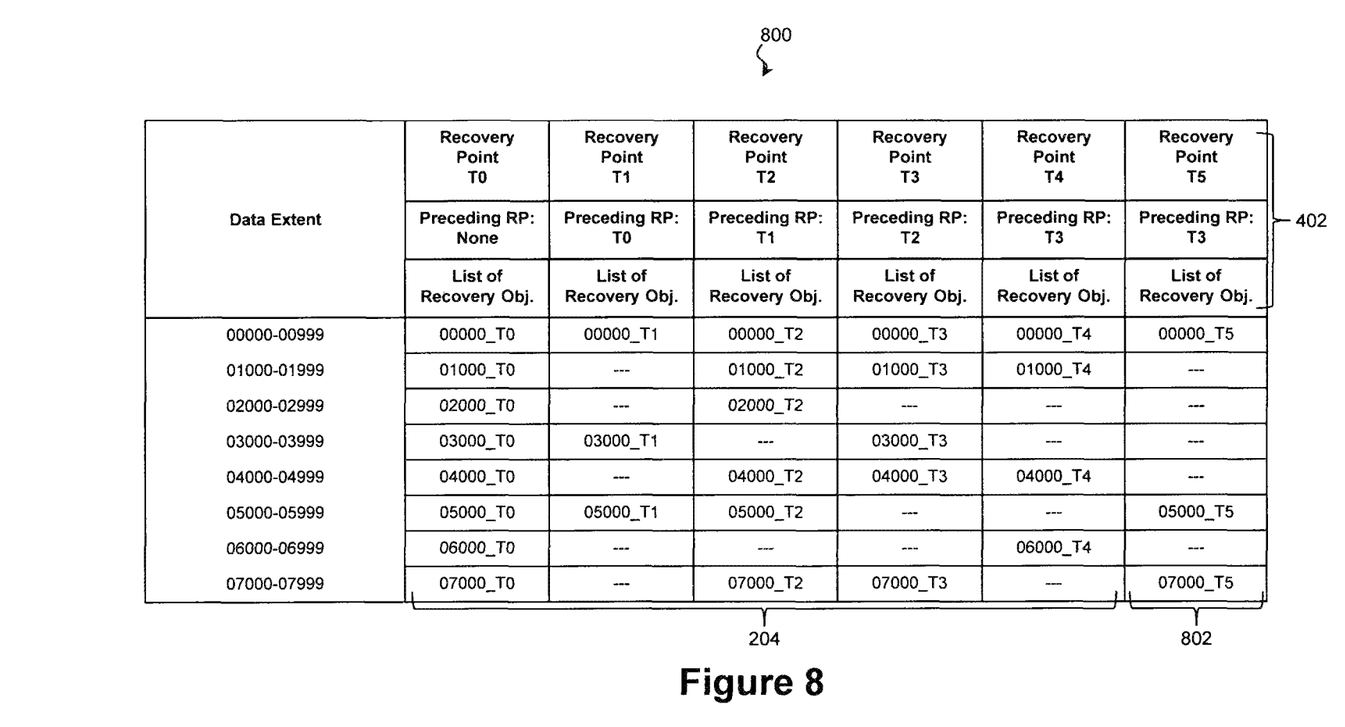
FIG. 8 is a memory diagram of the contents of an object store of an object-based backup system according to aspects of the present disclosure.
Figure 9:
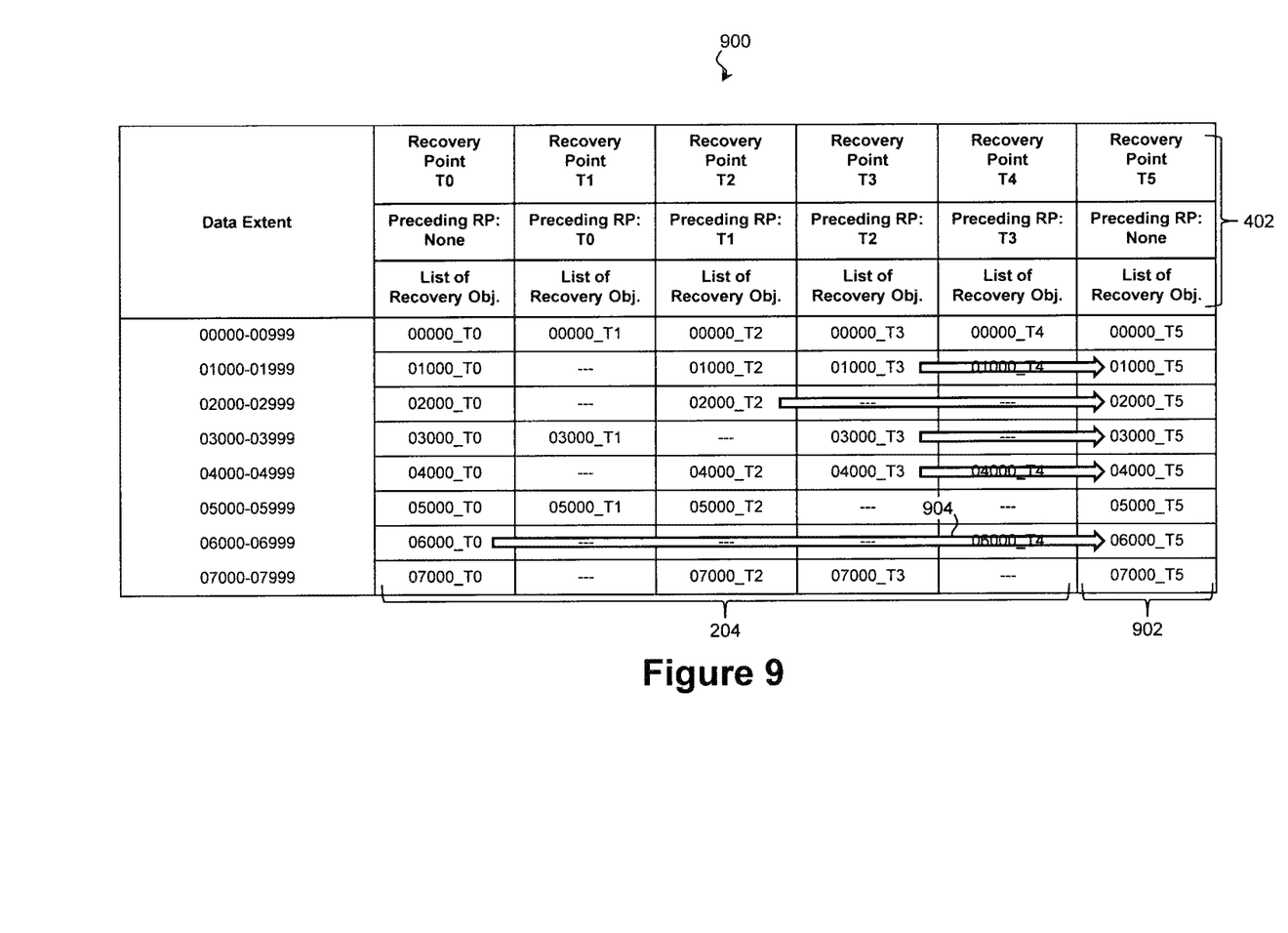
FIG. 9 is a memory diagram of the contents of an alternate object store of an object-based backup system according to aspects of the present disclosure.

Because data may be written or otherwise modified during the recovery, it may be beneficial to continue to make further backup copies after and even during the recovery process. An exemplary technique for making incremental backup copies is disclosed with reference to FIGS. 6 through 9. This technique may be performed concurrent with the method 300 of restoring data of FIG. 3. FIG. 6 is a schematic diagram of a computing architecture 600 including an object-based backup system according to aspects of the present disclosure. FIG. 7 is a flow diagram of a method 700 of backing up data to an object-based backup system according to aspects of the present disclosure. It is understood that additional steps can be provided before, during, and after the steps of method 700, and that some of the steps described can be replaced or eliminated for other embodiments of the method. FIG. 8 is a memory diagram of the contents of an object store of an object-based backup system according to aspects of the present disclosure. FIG. 9 is a memory diagram of the contents of an alternate object store of an object-based backup system according to aspects of the present disclosure.

Referring first to FIG. 6, the illustrated computing architecture 600 may be substantially similar to the computing architecture 200 of FIG. 2 and to the computing architecture 100 of FIG. 1. The computing architecture 600 may include one or more hosts 104, storage systems 102, and/or data recovery systems 202, each substantially similar to those described above. For example, one or more of the storage system 102 and the host(s) 104 may include a recovery module 208 operable to perform the method 300 of restoring data described above. The storage system 102 and/or host(s) 104 may also include a backup module 602 that performs the orderly backup of data at specific points in time. The backup module 602 may backup data stored in local storage devices 106 as well as in the storage devices 106 of other computing systems.

For this purpose, the backup module 602 may initialize and maintain a write log 604 to track data extents that have been modified since the preceding recovery point (typically, but not always, the recovery point of the last backup copy made). The write log 604 contains a number of entries that record whether data has been written or otherwise modified.

As noted above, the method 700 of backing up data may be performed concurrently with the recovery process of method 300 of FIG. 3. Accordingly, referring to block 702 of FIG. 7, the backup module 602 initializes the write log 604 during the recovery process of method 300. In its initial state, the write log 604 records that no data has been modified because, absent any incoming transactions, the data written to the storage devices 106 will match the data of the recovery point being restored. Referring to block 704 of FIG. 7, the backup module may also record various information regarding the recovery process such as the recovery point being recovered, timestamps of the recovery objects 204, object identifiers of the recovery objects 204, metadata (such as a volume alias, volume size, RAID status, thin-provision status, data encryption information, permissions, and/or other suitable metadata), and/or any other suitable information. The recorded recovery point may be used as a reference for future backups as explained in detail below.

Referring to block 706 of FIG. 7, the system containing the backup module 602 continues to service transactions substantially as described in block 320 of FIG. 3. When a transaction modifies data on the storage devices 106, the backup module 602 records the data extents having modified data in the write log 604 in block 708 of FIG. 7.

Referring to block 710 of FIG. 7, the backup module 602 detects a trigger that initiates a backup procedure. The backup procedure may be initiated in response to any suitable trigger, such as a certain interval of time, a count of modified data extents exceeding threshold, a count of transactions exceeding a threshold, an indicator of a system error, a system shutdown or other maintenance task, a user command, and/or any other suitable trigger. As discussed above, the backup procedure may be performed at any time during the recovery process of method 300. At the start of the backup procedure, a snapshot of the data on the local storage devices 106 may be made. As part of the snapshot, a second write log 604 may be initialized. Writes that occur after the snapshot are recorded in the second copy of the write log 604 so that they do not affect the copy currently being used in the backup procedure.

Referring to block 712 of FIG. 7, the backup module 602 identifies the data extents that have been modified from the write log 604. The backup module 602 will construct recovery objects 204 for the modified data. In some embodiments, the backup module 602 can be assured that sufficient data is present to construct the recovery object 204 because of the nature of the recovery process. A write may cause the recovery module 208 to perform a high-priority recovery of the data to be overwritten and its surrounding data. If data is recovered in the same sized units as it is backed up, performing a write will include recovering sufficient data for the backup module 602 to construct a new recovery object 204. In such examples, if the write has completed and been recorded in the write log 604, sufficient data has been recovered and stored to the storage devices 106 to construct the new recovery object 204.

However, there is no requirement that data be recovered by the recovery module 208 in the same object-sized chunks. Therefore, constructing the recovery objects 204 may entail reading unmodified data surrounding the modified data. Accordingly, referring to block 714 of FIG. 7, the backup module 602 determines whether this unmodified data has been recovered yet. If not, the backup module 602 instructs the recovery module 208 to prioritize recovery of the surrounding unmodified data as shown in block 716 of FIG. 7.

Referring to block 718 of FIG. 7, the backup module 602 constructs recovery objects 204 for each of the modified data extents recorded in the write log 604. The new recovery objects 204 may include unmodified data in adjacent addresses to fill out the recovery objects 204. The backup module 602 may include metadata such as timestamps, permissions, encryption status, and/or other suitable metadata corresponding to the modified and unmodified data in the recovery object 204 or in a separate recovery object 204. The backup module 602 may also create a manifest 404 identifying the recovery point, identifying the preceding recovery point, listing the associated recovery objects 204, and/or specifying any other suitable information.

Referring to block 720 of FIG. 7, the backup module 602 determines whether an incremental backup or a full backup is being performed. For an incremental backup, the backup module 602 provides the new recovery objects 204 of block 718 to the data recovery system 202 for storing as shown in block 722. For data extents that contain only unmodified data can be excluded and, recovery objects 204 need not be provided. The backup module 602 also specifies the current and preceding recovery points to the data recovery system 202. This may be provided in the form of a recovery object 204, metadata, or in any other suitable form. For the first incremental backup following the start of a recovery procedure, the preceding recovery point is the recovery point being recovered, not necessarily the latest recovery point. This is because the data is being restored to its state at the recovery point being recovered. For all subsequent incremental backups, the preceding recovery point is the one previous in time.

A simple example of an incremental backup is explained with reference to FIG. 8. The memory diagram 800 of FIG. 8 shows the recovery objects stored in the data recovery system 202 at recovery point T5 corresponding to the first incremental backup made after beginning a recovery process to restore recovery point T3. The backup module 602 stores the recovery objects containing the modified data identified in block 712 (labeled recovery objects 802 for clarity), while excluding recovery objects that would only contain unmodified data. For the new recovery point T5, the preceding recovery point is T3, not T4, because T5 represents changes made after T3 has been restored. In other words T5 represents the state of the data after the changes of T4 have been undone by the recovery process of method 300. One of the benefits of the present technique is that a complete backup of the data at time T5 can be created even if the recovery of data at time T3 has not yet completed. This is one of the significant advantages over conventional techniques.

Referring back to FIG. 7, for a full backup, the backup module 602 also provides the recovery objects 204 containing modified data and created in block 718 to the data recovery system 202 for storing as shown in block 724. For data extents that contain only unmodified data, the backup module 602 may instruct the data recovery system 202 to copy the recovery objects 204 from the preceding recovery point rather than wait for each of the data extents to be recovered by the recovery module 208 and then create new recovery objects 204. Copying directly avoids burdening the network 206 with exchanging new recovery objects 204 that are substantially the same as the existing recovery objects 204 and avoids disrupting the recovery process being performed by the recovery module 208.

A simple example of a full backup is explained with reference to FIG. 9. The memory diagram 900 of FIG. 9 shows the recovery objects stored in the data recovery system 202 at a recovery point T5 corresponding to a full backup made after beginning a recovery process to restore recovery point 13. The backup module 602 stores the recovery objects containing the modified data identified in block 712 (labeled recovery objects 902 for clarity), while copying recovery objects that would only contain unmodified data from other recovery points. Arrows, such as arrow 904, indicate those recovery objects 204 that copied directly. In the example, many of the recovery objects 204 are copied directly, which may greatly simply the backup process. As with the incremental backup process, a complete backup of the data at time T5 can be created even if the recovery has not yet completed.

For both full and incremental backup procedures, the method 700 provides an efficient and reliable technique for working with and backing up data even while the data set is being restored from a backup copy. The present embodiments can take the form of an entirely hardware embodiment, an entirely software embodiment, or an embodiment containing both hardware and software elements. Accordingly, it is understood that any of the steps of method 300 or method 700 may be implemented by a computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a method, a system, and a non-transitory machine-readable medium for backing up and restoring data from an object-based storage system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving, by a computing system, a set of data objects from a recovery system that is separate from the computing system;
   recovering data from the set of data objects; and
   while receiving the set of data objects: identifying a portion of recovered data that is modified by a data transaction of the computing system and providing a recovery data object based on the portion of recovered data from the computing system to the recovery system.

2. The method of claim 1, wherein providing the recovery data object is included in an incremental backup procedure that excludes a data object associated with only unmodified data.

3. The method of claim 1, wherein the set of data objects is associated with a first recovery point, and wherein the method further includes creating a second recovery point that references the first recovery point as a preceding recovery point.

4. The method of claim 1, further comprising instructing the recovery system to copy a data object stored on the recovery system to a new recovery point based on the data object containing only unmodified data.

5. The method of claim 1, further comprising, prior to identifying the portion of recovered data that is modified, recording in a write log that the portion of recovered data was modified upon completion of the data transaction by the computing system.

6. The method of claim 1, wherein receiving the set of data objects is performed in an order of priority based on the data transaction being performed by the computing system.

7. The method of claim 1, wherein receiving the set of data objects is performed in an order of priority based on when data associated with each object of the set of data objects was last modified.

8. The method of claim 1, wherein receiving the set of data objects is performed in an order of priority based on block address proximity to accessed data.

9. A computing device comprising:
a memory containing a machine-readable medium comprising machine executable code having stored thereon instructions for performing a method of data recovery; and
a processor coupled to the memory, the processor configured to execute the machine executable code to:
recover data by a storage system, including receiving a plurality of recovery data objects from a recovery system;
and while receiving the plurality of recovery data objects, further executing the machine readable code to:
perform a transaction directed to a portion of the data before the data is completely recovered by the storage system;
record, in a log file, the portion of the data as modified by the transaction;
use the log file to determine that the portion of the data has been modified; and
backup, to the recovery system, the portion of the data as modified before the data is completely recovered at the storage system.

10. The computing device of claim 9, wherein backing up the portion of the data that has been modified includes providing a new recovery data object based on the portion of the data as modified from the storage system to the recovery system.

11. The computing device of claim 9, wherein the plurality of recovery data objects is associated with a first recovery point, and wherein the processor is further configured to execute the machine executable code to create a second recovery point that references the first recovery point as a preceding recovery point.

12. The computing device of claim 9, wherein the processor is further configured to execute the machine executable code to instruct the recovery system to copy a data object stored on the recovery system to a recovery point based on the data object containing only unmodified data.

13. The computing device of claim 9, wherein the processor is further configured to execute the machine executable code to record in the log file that the portion of the data was modified upon completion of the transaction by the storage system.

14. The computing device of claim 9, wherein the plurality of recovery data objects is received by the storage system in an order of priority based on when data associated with each object of plurality of recovery data objects was last modified.

15. The computing device of claim 9, wherein the plurality of recovery data objects is received by the storage system in an order of priority based on block address proximity to accessed data.

16. A non-transitory machine-readable medium having stored thereon instructions for performing a method of data recovery, comprising machine executable code which when executed by at least one machine, causes the machine to:
recover data by a storage system, including receiving a plurality of recovery data objects from a recovery system;
and while receiving the plurality of recovery data objects, further causing the machine to:
perform a transaction directed to a portion of the data before the data is completely recovered by the storage system;
record, in a log file, the portion of the data as modified by the transaction;
use the log file to determine that the portion of the data has been modified; and
backup, to the recovery system, the portion of the data as modified before the data is completely recovered at the storage system.

17. The non-transitory machine-readable medium of claim 16, wherein backing up the portion of the data that has been modified includes providing a new recovery data object based on the portion of the data as modified from the storage system to the recovery system.

18. The non-transitory machine-readable medium of claim 16, wherein the plurality of recovery data objects is associated with a first recovery point, and having further instructions causing the machine to create a second recovery point that references the first recovery point as a preceding recovery point.

19. The non-transitory machine-readable medium of claim 16, having further instructions causing the machine to instruct the recovery system to copy a data object stored on the recovery system to a recovery point based on the data object containing only unmodified data.

20. The non-transitory machine-readable medium of claim 16, wherein the plurality of recovery data objects is received by the storage system in an order of priority based on when data associated with each object of plurality of recovery data objects was last modified.

* * * * *